United States Patent [19]
Evans

[11] 3,820,288
[45] June 28, 1974

[54] QUICK-CHANGE WHEEL GUARD FOR TOOL AND CUTTER GRINDER

[75] Inventor: Wendell Irving Evans, Cincinnati, Ohio

[73] Assignee: Cincinnati Milacron Inc., Cincinnati, Ohio

[22] Filed: Jan. 10, 1973

[21] Appl. No.: 322,277

[52] U.S. Cl. ............................................... 51/269
[51] Int. Cl. ........................................... B24b 55/04
[58] Field of Search .............. 51/268, 269, 272, 274

[56] References Cited
UNITED STATES PATENTS

| | | | |
|---|---|---|---|
| 2,374,988 | 5/1945 | Flohr | 51/269 |
| 2,471,561 | 5/1949 | Fielding | 51/269 |
| 2,707,854 | 5/1955 | Johnson | 51/268 X |
| 2,894,418 | 7/1959 | Jackson | 51/268 X |
| 3,571,983 | 3/1971 | Stewart | 51/269 |

FOREIGN PATENTS OR APPLICATIONS

| | | | |
|---|---|---|---|
| 940,226 | 10/1963 | Great Britain | 51/268 |

*Primary Examiner*—Othell M. Simpson

[57] ABSTRACT

A quick-change guard for a machine tool supporting a rotating tool, the guard having a sectioned cup-shaped backplate located perpendicular to the axis of and to the rear of the rotating tool, said backplate having a lip on the forward edge of the cupped portion designed to receive the interlocking lip of a series of shields releasably secured to the backplate, each shield encircling a portion of the tool and containing a face plate extending therefrom to enclose a substantial portion of the rotating tool. The backplate is slidably secured to the machine tool in order that it may be placed in the most appropriate position with respect to the rotating tool.

3 Claims, 5 Drawing Figures

PATENTED JUN 28 1974 3,820,288

3,820,288

QUICK-CHANGE WHEEL GUARD FOR TOOL AND CUTTER GRINDER

BACKGROUND OF THE INVENTION

This invention relates to cutting tool guards and more particularly to a wheel guard for tool and cutter grinders.

In tool and cutter grinding operations, the grinding wheel is changed periodically to make possible the performance of a variety of grinding operations. Various guard structures have been designed which are suited for each of the many wheels and operations employed on the tool and cutter grinder. Several designs, permitting quick-change of guards and shields, and maintaining permanent alignment of the guard with respect to the wheelhead have been recently developed.

One such device is disclosed in the co-pending application of C. R. Eby, entitled "Quick-change Wheel Guard for Tool and Cutter Grinder," filed Nov. 2, 1972, U.S. Ser. No. 303,005 and assigned to the present assignee. Another such device is disclosed in the co-pending application of the present applicant, filed even date herewith, U.S. Ser. No. 322,278, and entitled "Quick-change Wheel Guard for Tool and Cutter Grinder," and assigned to the present assignee.

Applicant herein discloses a new type of cutter guard which can be changed quickly and requires no relocation of the guard in relationship to the wheel. Thus, the present invention provides a quickly changeable and easily replaceable wheel guard for tool and cutter grinder operation.

SUMMARY OF THE INVENTION

The invention provides a partial cup-shaped backplate forming a primary guard, which is in permanent alignment with the wheelhead and slidably received by a securing means which is permanently attached to the wheelhead. This allows for placing the partial backplate in any desired position with respect to the grinding wheel, thus allowing maximum clearance at the point of grind. The backplate contains an outer lip on the periphery, the lip having a rake sloping toward the rear of the backplate. A series of shields having face plates designed to form a secondary guard enclosing a portion of the grinding wheel may then be secured to the backplate by hooking an interlocking lip on the shield into the lip on the outer periphery of the backplate. By tightening a thumb screw or other shield securing means, the shields are wedged into place and tightly secured to the backplate. When it becomes necessary to change either the wheel or the grinding operation, the shield securing means is simply released and the shield removed. A new shield may then be placed on the locating lip and secured to the backplate. If desired, the backplate may be moved about the periphery of the wheel to provide maximum clearance at the point of grind.

The backplate may further be designed to permit the insertion of an energy absorbing liner between the grinding wheel and the inner surface of the backplate for substantially dissipating the energy of broken tool fragments. Such a liner is disclosed in the co-pending application of Charles B. Matson, entitled "Wheel Guard for Tool and Cutter Grinder", filed Oct. 19, 1972, having U.S. Ser. No. 298,941 now abandoned.

In summary, the invention provides a quick-change wheel guard for use with tool and cutter grinders or similar machine tools requiring a number of guard structures for various machining operations.

DETAILED DESCRIPTION

Figure 1:
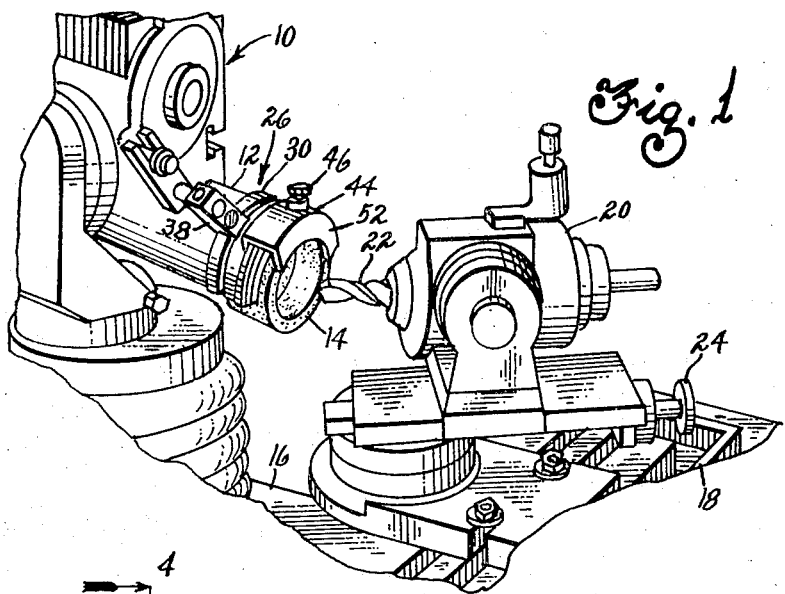
FIG. 1 is a perspective view of a tool and cutter grinder including the preferred embodiment of the present invention.

In FIG. 1 there is shown a tool and cutter grinder 10 having a wheelhead 12 containing a rotatable spindle 33 (see FIG. 3) for securing and driving a grinding wheel 14. The wheelhead 12 is secured to base structure 16 and is generally indexible in two planes. Also secured to the base structure 16 is a table 18 for securing and locating a workholder 20 which is designed to rotatably secure the tool or other workpiece 22 to be ground. The workholder 20 is generally indexible in two planes and means 24 are provided to move the work 22 with respect to the grinding wheel 14. The guard structure 26 is secured and located on the wheelhead 12 so that it substantially surrounds the entire grinding wheel 14. The backplate 30 of the guard sturcture 26 is placed in a plane perpendicular to the axis of the spindle 33 and to the rear of the wheel 14 forming a primary guard. The backplate has a central aperture 32 through which the spindle 33 may pass, see FIG. 3. The wheel 14 is sandwiched between two wheel flanges 34 and 35, and secured to the spindle 33. The backplate 30 of the guard structure is cut away to partially expose the periphery of the grinding wheel 14, thus allowing maximum clearance at the point desired during a grinding operation.

Figures 3, 4:
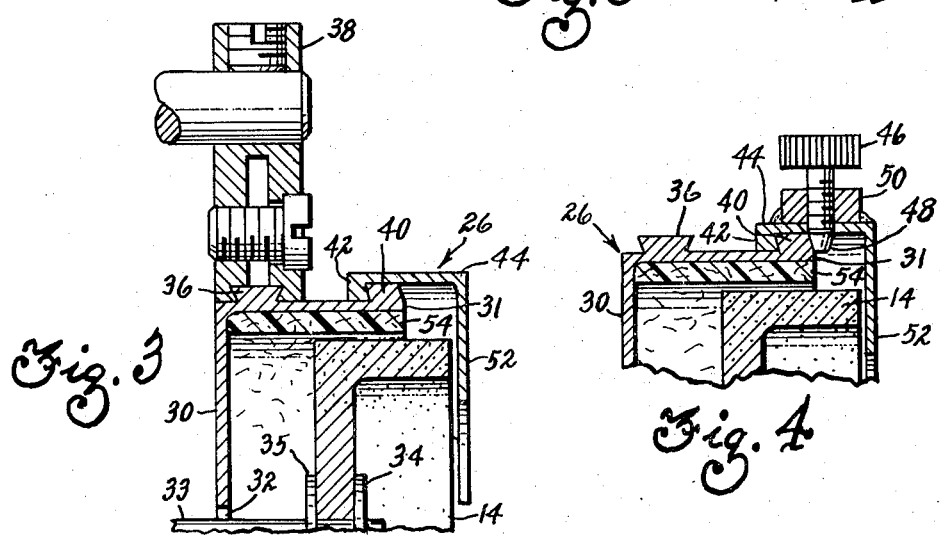
FIG. 3 is a section view taken along lines 3—3 of FIG. 2, showing particularly the securing means for securing the backplate to the wheelhead.
FIG. 4 is a section view taken along lines 4—4 of FIG. 2 showing particularly the securing means for securing the shield to the backplate.

As best shown in FIGS. 3 and 4 the backplate 30 includes a dove-tailed way 36 extending around the periphery of the rear of the cupped portion. The way 36 is suited to be received by well-known adjustable securing means, such as the saw-slot friction clamping mechanism 38. The securing means 38 is permanently affixed to the wheelhead 12, thus providing permanent and accurate alignment of the backplate 30 with respect to the grinding wheel 14.

Figures 2, 5:
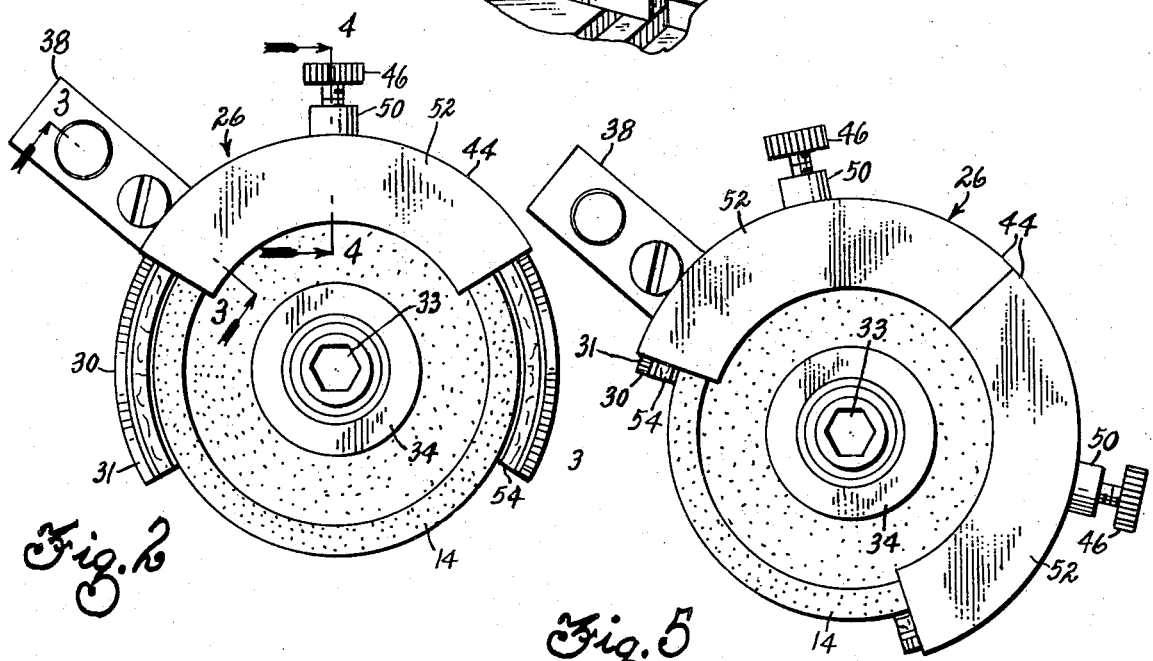
FIG. 2 is a front view of the grinding wheel and the guard assembly showing the various elements of the guard structure.
FIG. 5 is similar to FIG. 2 showing a series of shields secured to the backplate.

The front edge 31 of the cupped portion of the backplate 30 contains raked lip 40. The lip 40 extends around the periphery of the cup, the rake sloping to the rear of the backplate 30, and is suited to receive an interlocking lip 42 permitting placement of the shield 44 on the backplate 30 to provide secondary guarding. The shield 44 contains a thumb screw 46 having a tapered end portion 48. The shield 44 is tightly secured to the backplate 30 by simply turning the thumb screw into tapped receptcle 50 which is integral with the shield 44. The shield 44 also contains a face plate 52 which envelops a portion of the grinding wheel 14. The shield may be placed on any portion of the backplate 30, as is shown in FIG. 2 and where desired a plurality of shields may be secured to the backplate 30, see FIG. 5.

By adjusting the tension of the securing means 38 the backplate 30 may be moved to any desirable position with respect to the grinding wheel 14. With proper placement of the backplate 30 and utilization of the proper number of shields 44 placed in the desired position, maximum guarding may be utilized for any particular operation.

The guard of the present invention may further include a deformable liner 54 interposed between the grinding wheel and the inner wall of the backplate 30. The liner 54 is designed to dissipate energy released by broken tool fragments in the event of wheel fracture. A suitable device is disclosed in the aforementioned copending application of C. B. Matson.

Thus, the described embodiments of the present invention provide quickly changeable shields for cutter grinder operation. While particular embodiments have been shown and described, it should be understood that many other arrangements using the teachings of this disclosure could be utilized without varying from the scope and spirit of the invention, or the appended claims.

What is claimed is:

1. A quick-change guard for a tool and cutter grinder having a rotating grinding wheel, said guard comprising:
   a. a cup-shaped backplate having a cut-away portion and located perpendicular to the axis of and to the rear of said rotating wheel, fixedly secured to the tool and cutter grinder, forming a primary wheel guard;
   b. a securing means fixedly secured to the tool and cutter grinder;
   c. a saw-slot friction clamping mechanism connected to said securing means;
   d. a dove-tailed way on the periphery of the rear portion of the backplate suited to be received by said saw-slot friction clamping mechanism for adjustably securing the backplate to the securing means;
   e. a raked lip on the front periphery of the backplate;
   f. a shield providing secondary guarding;
   g. an interlocking lip attached to said shield and suited to be received by said raked lip;
   h. means connected to said shield for increasing the tension between said lips;
   i. a face plate secured to said shield substantially enclosing a portion of the grinding wheel; and
   j. a deformable liner interposed between the backplate and the grinding wheel.

2. A quick-change guard for a machine tool supporting a rotating tool comprised in part of a cup-shaped primary shield having a cut away portion and located perpendicular to an axis of and to the rear of the rotating tool, a securing means fixedly secured to the machine tool, and a secondary shield having a faceplate enclosing a substantial portion of the rotating tool, wherein the improvement comprises:
   a. a dove-tailed way located along a first circumferential line on an outer surface of the primary shield;
   b. a second securing means attached to said securing means and designed to receive said dove-tailed way, whereby loosening the second securing means permits adjustment in angular position of the primary shield circumferentially with respect to the rotating tool, and tightening the second securing means clamps the primary shield in an angular position with respect to the rotating tool;
   c. a first lip located along a second circumferential line on an outer surface of the primary shield, having at least one raked face;
   d. a second lip located along a third circumferential line on an inner surface of the secondary shield, having at least one raked face designed to be received in an interlocking fashion by said raked face of said first lip;
   e. a third securing means designed to engage said first lip, whereby loosening the third securing means permits adjustment in angular position of the secondary shield circumferentially with respect to the rotating tool, and tightening the third securing means clamps the secondary shield to the primary shield in an angular position with respect to the rotating tool.

3. The apparatus of claim 2, wherein the improvement further comprises a deformable liner placed within the cup-shaped primary shield and interposed between said primary shield and the rotating tool.

* * * * *